O. T. GREGORY & N. W. CARKHUFF.
PHOTOGRAPHIC COPYING APPARATUS.
APPLICATION FILED JUNE 7, 1913.
1,127,231.
Patented Feb. 2, 1915.
3 SHEETS—SHEET 3.
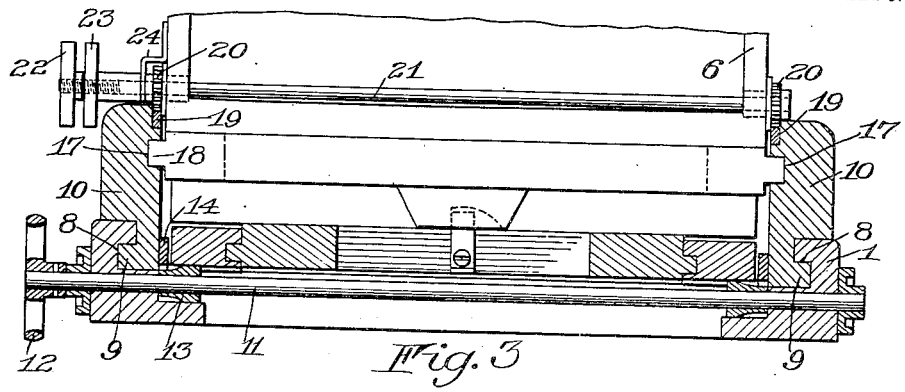
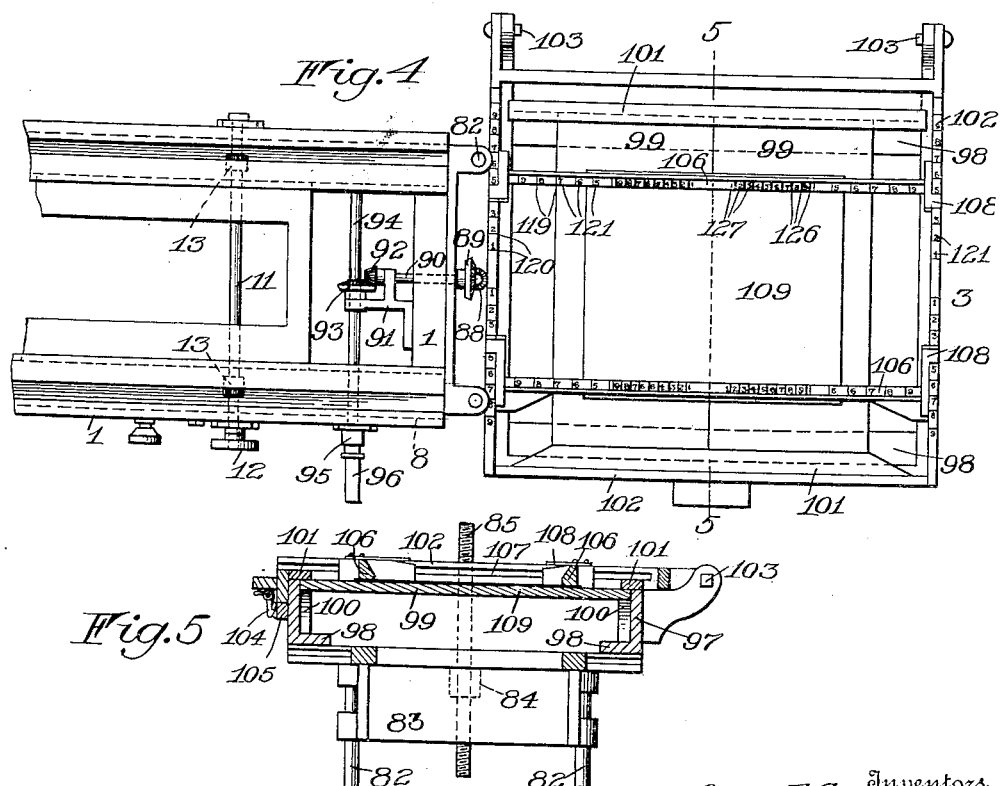
Witnesses
Walter B. Payne
Inventors
Oscar T. Gregory
Norman W. Carkhuff
By Church Rich
their Attorneys

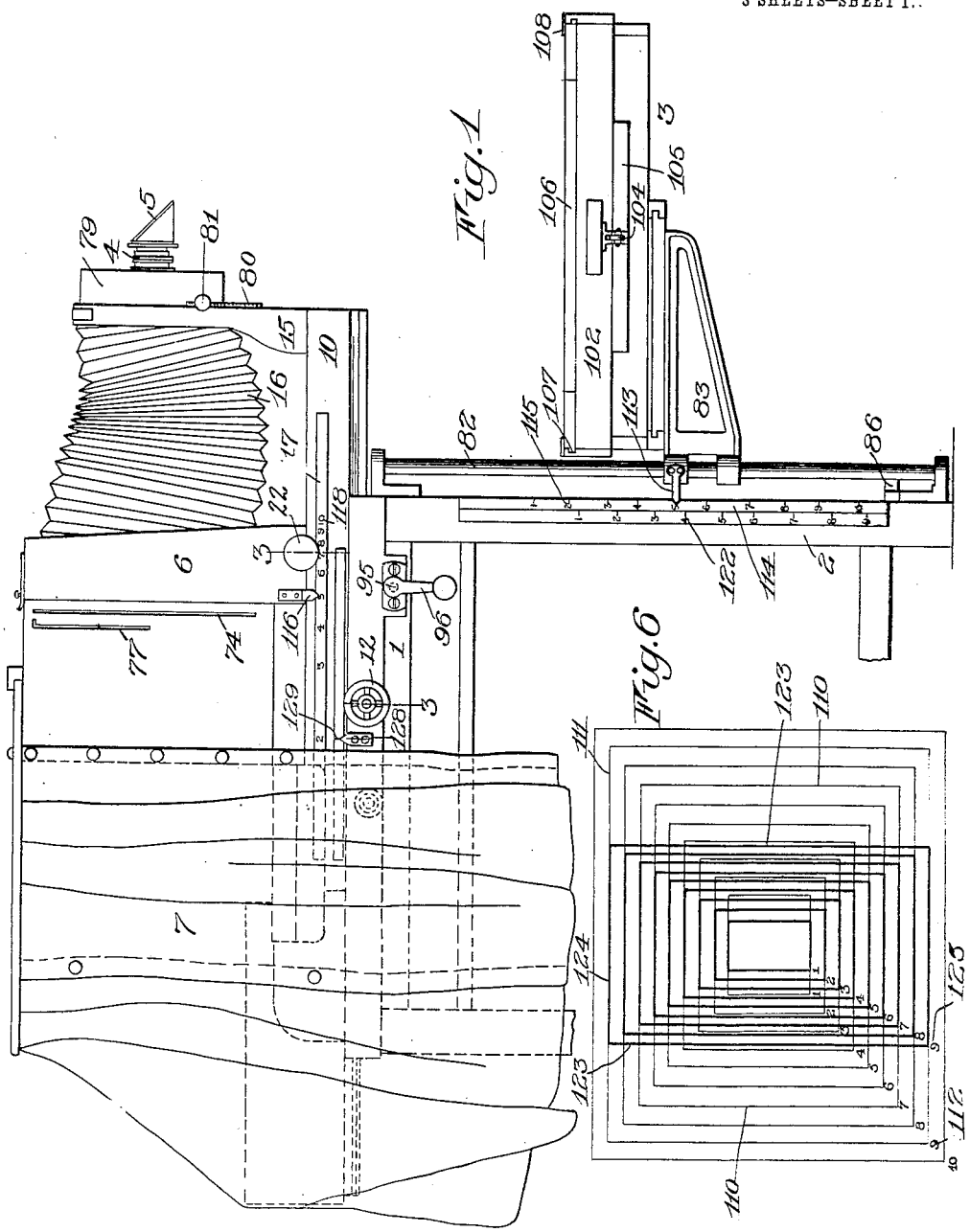

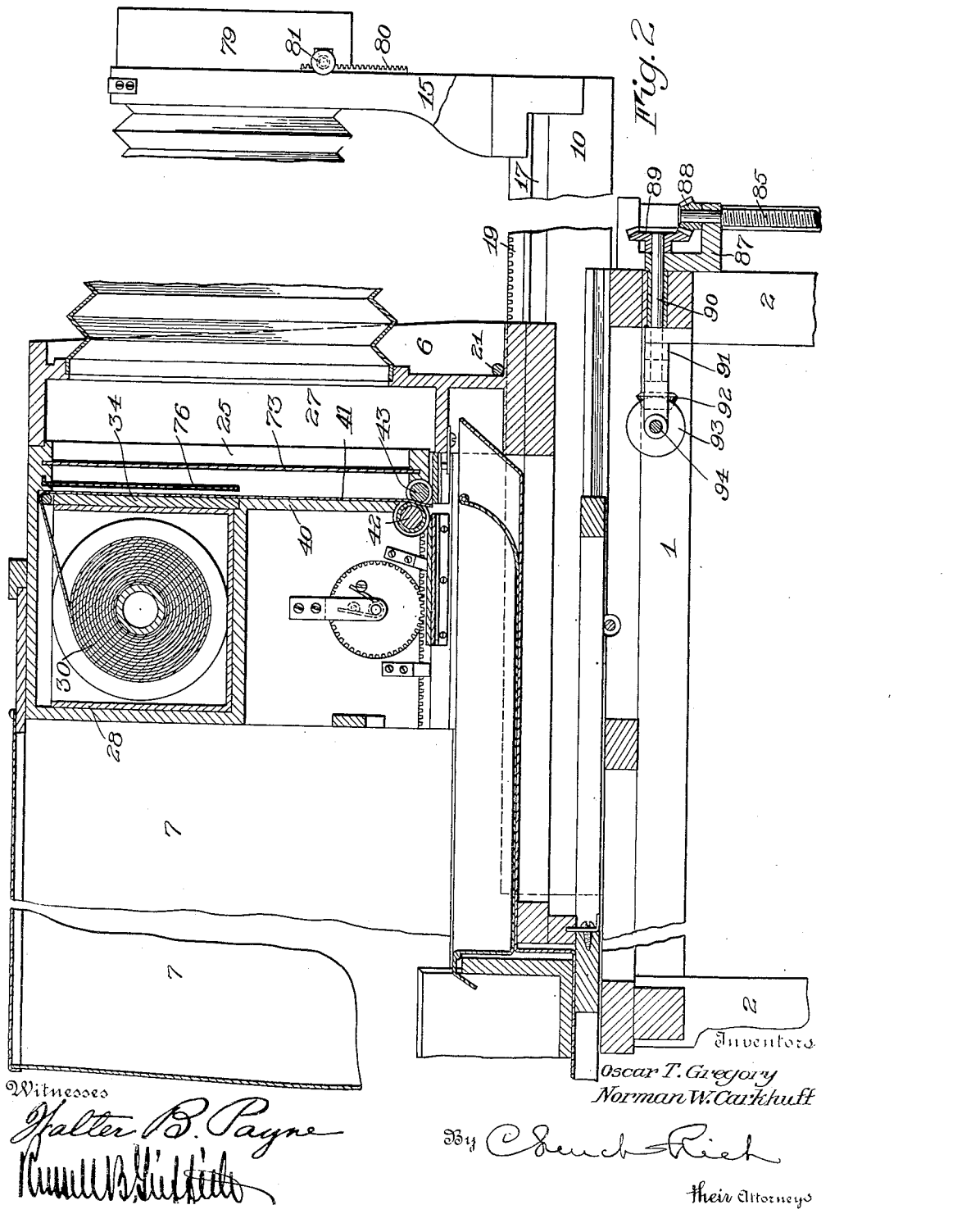

UNITED STATES PATENT OFFICE.

OSCAR T. GREGORY, OF SAN ANTONIO, TEXAS, AND NORMAN W. CARKHUFF, OF CHICAGO, ILLINOIS, ASSIGNORS TO COMMERCIAL CAMERA COMPANY, OF PROVIDENCE, RHODE ISLAND, A CORPORATION OF RHODE ISLAND.

PHOTOGRAPHIC-COPYING APPARATUS.

1,127,231.      Specification of Letters Patent.      Patented Feb. 2, 1915.

Original application filed April 15, 1910, Serial No. 555,709. Divided and this application filed June 7, 1913. Serial No. 772,238.

*To all whom it may concern:*

Be it known that we, OSCAR E. GREGORY and NORMAN W. CARKHUFF, of San Antonio, in the county of Bexar and State of Texas, and of Chicago, in the county of Cook and State of Illinois, respectively, have invented certain new and useful Improvements in Photographic-Copying Apparatus, and we do hereby declare the following to be a full, clear, and exact description of the same, reference being had to the accompanying drawings, forming a part of this specification, and to the reference-numerals marked thereon.

The present invention relates to photography and more particularly to machines for making photographic copies of documents and other relatively small objects of different sizes capable of being handled and arranged, and it has for its object to provide a simple and efficient machine of this character adapted more particularly for general commercial use and one that may be successfully operated by persons not particularly skilled in the photographic art.

A further object is to provide means for the reception of the article to be photographed and devices through the adjustment of which the said article or object is automatically brought into focus with respect to the camera lens and at the same time positioned at such a distance therefrom as to cause its image to appear in the photograph as of a maximum size, permitted by an area of the sensitized surface exposed.

To these and other ends the invention consists in certain improvements and combinations of parts all as will be hereinafter more fully described, the novel features being pointed out in the claims at the end of the specification.

In the drawings: Figure 1 is a side elevation of a photographic apparatus constructed in accordance with and illustrating one embodiment of the invention; Fig. 2 is a longitudinal central section through the camera proper and adjacent parts; Fig. 3 is a transverse section through the support, the bed frame and the camera body showing the means for operating such parts relatively, the section being taken substantially on the line 3—3 of Fig. 1; Fig. 4 is a top plan view of the object holder and adjacent portions of the support; Fig. 5 is a transverse section taken centrally through the object holder substantially on the line 5—5 of Fig. 4, and Fig. 6 is a top plan view of the chart used in some instances for gaging the size of the objects to be photographed.

Similar reference numerals throughout the several figures indicate the same parts.

Referring first to the general features of construction and operation the device comprises a suitable standard or support 1, preferably in the nature of a table, having legs 2 and guided vertically thereon at one side is an object holder 3. Movable horizontally on top of the support is a camera having a lens tube 4 fitted with an angularly arranged mirror 5 that directs the rays vertically as they pass between the object holder and the lens. The lens itself is not shown, a tube of this character being well known in the art. Means are provided for focusing the camera on the object holder according to its position with respect to its distance from the lens and the latter, of course, determines the size of the image as it appears in the focal plane of the camera, while the movement of the latter bodily permits the lens, through the medium of the mirror, to be centered upon any desired portion of the object holder.

In the lower part of the camera body 6 is a chamber into which the exposed print or negative is automatically fed and severed from a continuous roll of sensitized material and it is preferably caught in a developing pan or container from which it is subsequently transferred to a second and preferably rearwardly arranged pan or container filled with the fixing agent, the portions of both pans, which would otherwise be exposed, being protected by a light excluding hood 7 that hangs in rear of the camera. The operator can reach beneath this hood to manipulate the negatives by hand and withdraws the finished photograph from beneath the same.

The apparatus herein illustrated was particularly designed for commercial photography, being of great utility in obtaining photographic copies of written documents, records, etc., which can be rapidly done at small expense in less time than it would take to copy this work in any other way and with absolute accuracy.

Having given a general idea of the main features of the apparatus, its purposes and functions, we will now describe in detail the particular embodiment of the invention illustrated in the drawings in so far as it relates to the features which characterize it as a copying camera. Such subject matter as relates to the camera proper and is of general application is described and claimed in our pending application, Serial No. 555,709, filed April 15, 1910 of which this application is a division.

Referring more particularly to Figs. 1, 2 and 3, the side rails of the supporting table 1 are provided on their inner sides with guiding grooves 8 in which slide the ribs 9 of a bed frame 10 which carries the camera proper and by means of which the latter is moved bodily on the support. A shaft 11, journaled in the latter and having an exteriorly arranged knob or handle 12, has fixed thereon pinions 13 that mesh with racks 14 on the frame 10 and provide means for effecting the movement thereof.

The camera front 15 is preferably rigidly secured at the forward end of this frame 10, but the body portion 6 with which the front is connected by the usual bellows 16, is adjustable on the bed frame, the camera in the present instance being of a rear focus type. To this end the bed frame is provided on the inner faces of its side rails with guiding grooves 17 to receive coöperating ribs 18 on the camera body 6 and also with racks 19 meshing with pinions 20 fixed to a shaft 21 journaled in the body and having an exteriorly arranged operating knob 22 by the rotation of which the body is moved up and down the frame relatively to the front and, as the sensitized material is carried with the body, the focusing is thus effected. The jam nut 23 threaded on the end of the shaft 21 may be tightened against a flange 24 on the body that is interposed between said nut and one of the pinions 20 to lock the body in place on the frame, when desired.

The sensitized material used in the machine is preferably a continuous strip or web of paper wound in a roll 30 in a chamber 28 within a back 25. The front wall of this back, composed in the present instance of a door 34, through which access is had to the chamber 28, and a portion 40, closes at the rear the exposure chamber 27 within the body 6 and forms a backing against which that portion of the strip of sensitized material that is stretched in the focal place is held in a flat position for exposure. This strip is suitably led from the roll down across the wall 34–40 to a point at the lower part of the exposure chamber 27 where it is passed between feed rolls 42–43, but the further treatment and final disposition of the material is not important to the present invention and hence reference is made to our other application above identified for a disclosure of such subject matter. Suffice it to say that a greater or less amount may be fed into or out of the field of exposure as the operator desires and that which is in position for exposure may be marked off at any time by a shutter device 73 which is entered through an opening 74 in a side wall of the casing of the back 25.

In some instances a photograph of a desired size will have an area amounting to only a fraction of the expanse 41 of the sensitized strip which, as heretofore described is brought into position for exposure in the focal plane against the wall 34–40. Unless otherwise provided for, such a photograph would be recorded upon the center of the sheet and the margin surrounding it would be wasted. To provide against such waste we employ a second shutter member 76 which is entered through an opening 77 in the side of the back 25 corresponding to the opening 74 for the shutter 73. This second shutter is preferably arranged parallel with and in rear of the first and is of such size as to obscure or mask off a portion of that part 41 of the strip which would otherwise be in a position for exposure. The part that is so masked amounts, in the present instance, to half of the sheet 41 and that the upper half. The lower half, of course, could be masked instead but it would necessarily be done after the exposure thereof and such negative would have to be delayed and could not be issued from the camera until the other half had been exposed.

To enable the lens to be centered on this lower unexposed half, the mount 79 of the lens tube 4 is fitted for vertical movement on the front 15 and can be raised and lowered by any suitable means, such as the rack 80 and pinion shaft 81, indicated in Fig. 1. In its upper position the lens is, of course, centered upon the entire expanse of the sensitized material.

We will now describe the holder or support for the object to be photographed and the manner in which it coöperates with the camera proper to bring about the results previously indicated as being the broader functions of the apparatus. At the front of the supporting table 1 we arrange a pair of vertical guide rods 82 (Figs. 1 and 4) upon which can be raised or lowered a sliding elevator or carriage 83. This carriage has a projecting lug 84 (shown in dotted lines in Fig. 5) having threaded therein a centrally arranged vertical screw 85 journaled at its lower end in a bracket 86 and its upper end in a bracket 87 above which bracket it is provided with a beveled gear 88 meshing with a gear 89 fixed to a shaft 90 extending horizontally from front to rear of the machine and journaled in a supporting frame 1 (Fig. 2) and in a bracket 91. A second gear 92 on this shaft (Fig. 4) meshes with a gear 93 on a shaft 94 extending transversely of the support and projecting at one side thereof, as at 95, whereat is attached an operating crank 96. This crank 96 is arranged for convenience in the neighborhood of the operating knobs 12 and 22 that control the movements of the camera and is preferably removable so as not to be in the way of the operator when not in use.

The specific construction of the object holder we prefer to utilize is best illustrated in Figs. 1, 4 and 5. The carriage 83 supports a frame 97 having oppositely exposed inwardly extending shoulders 98 on which are slidingly supported within the frame two panels 99, leaf springs 100 being interposed between them and the ledges so that they are normally held against upper overhanging shoulders 101. In this position their upper surfaces define the plane with reference to which the camera is focused. A clamping frame 102 is pivoted to the carriage frame 97 at 103 and is secured in a position in which it coöperates therewith by a suitable latch 104, such position being defined by a stop 105. This frame carries a pair of bars 106 slidable in guides 107 thereon and normally held in position by the tension of leaf springs 108 bearing on the tops of the rails forming the frame. The bars normally meet the surfaces of the panels 99 when the holder is empty and the object is held within the holder by being clamped between the bars and the panels, the springs 100 being adapted to yield sufficiently to accommodate objects of different thicknesses, the upper surfaces of which, however, will always be held in the plane of focus mentioned.

If the article or object be a substantially plane sheet, such as indicated by 109 in Figs. 4 and 5, the panels 99 are moved to abutting position centrally of the holder to present a substantially broken supporting surface, but in the event that copies are to be made of the pages of a book, for instance, the panels are separated so that the back of the book, while in open condition, can be accommodated between their adjacent edges, as will be understood. If the book be opened otherwise than at its center, the springs 100, independently supporting the panels, will be differently compressed and even though the pile of pages on each be of unequal thicknesses, the top pages will be presented in the same plane.

With the mechanism described, the carriage 83 may be raised and lowered at will traveling with these movements toward and from the lens tube 4, and while this movement is in fact transversely of the optical axis of the lens it is in line with the axis of projection thereof because of the provision of the mirror 5 which gives the same result as though it were directly in front of the lens and in line with the optical axis. Assuming, therefore, that the dimensions of the portion 41 of the sensitized strip, that is exposed in the focal plane of the camera, be 7 by 14 inches square, there will be a point in the travel of the object holder on its guides toward and from the lens at which an object arranged thereon and having approximately the same dimension of 7 by 14 inches will have its image projected in the focal plane of the camera in actual size. There will also be points at which objects of smaller dimensions will appear enlarged to a maximum size recordable on the exposed sheet and objects of greater dimensions will appear reduced to a size that can be accommodated. In each case, however, the focusing adjustments of the camera will be different, that is, the back and body will have a different position with reference to their distance from the lens. In other words, in order to bring an object of a given size into proper focus at the same time at the proper distance from the lens to record an image of maximum proportion on the exposed sheet of sensitized material a differential movement of the object holder and camera back, respectively, relatively to the lens is required. Of the three elements involved, viz., the sensitized material, the lens and the object, two must be differentially movable relatively to the third. It may be here stated that we elect to employ a back focusing camera because, with the arrangements of the present apparatus, were the focusing effected by a movement of the lens, it would involve centering it each time in its overhanging position above the object holder. We, therefore, provide means whereby with the dimensions of the object predetermined the parts may be quickly and properly adjusted without trial by ground glass focusing or otherwise and the above results obtained. To this end we use a chart, gage or scale, a convenient form of which is illustrated in Fig. 6, marked with a series of concentric areas having their dimensions expressed by the lines 110 and 111. The object can be measured to ascertain the largest area of the chart within which it can be accommodated by placing the chart beneath it or otherwise and the several areas are indicated by a series of, in the present instance, arbitrary characters 112. On the object holder or its carriage 83 is mounted an indicator finger 113 that traverses a scale 114 stationarily arranged preferably on a leg 2 of the support to form an index for indicating the positions of the object holder with respect to its distance from the lens. The series of characters 115 on the scale are expressed in the terms of and correspond to the designating characters 112 of the chart by means of which the size of the object is measured. Similarly, a pointer 116 on the camera body 6 coöperates with a scale 117 on the bed frame of the camera to form an index for the focusing adjustments of the back and body relatively to the lens carrying front and the characters 118 thereon correspond with the characters 115 on the object holder scale 114.

Both of the scales are of a purely empirical nature and their subdivisions will vary with the focal length of the lens, but these are so arranged that when the readings of the indexes are the same, the object holder, or at least the article held thereby, will be in proper focus. Also, the area on the chart, the designating character 112 of which corresponds to these readings, will indicate the maximum area that can be recorded on the sensitized sheet 41 in the focal plane of the camera. Thus, supposing the operator finds that the outline of his object falls within that one of the areas 112 numbered "5" in Fig. 6 of the drawings overlaps the area "4", which is the next smaller one, he positions his object holder so that its index reads 5, as shown in Fig. 1, and manipulates the focusing devices of the camera so that the index scale 117 also reads at 5. He then knows that the article being photographed is in focus and that it is near enough to the camera for its image to occupy the whole of the sheet of sensitized material, yet it has taken but a fraction of time to make the necessary adjustments and has not necessitated focusing and refocusing with a ground glass with the object arranged at various trial distances, all this having been done for him by the builder of the machine. The characters 112, 115 and 118, it will be seen, may be purely arbitrary and not necessarily have the sequential value shown, the only consideration being that the corresponding units of each index be readily ascertainable.

For convenience the chart shown in Fig. 6 might be secured to one or both of the panels 99 of the object holder, but we find it practicable to place marks 119 and 120 on the bars 116 and the side rails of the clamping frame 102 corresponding to the lines on the chart indicated by 110 and 111 so that the same areas may be ascertained without the use of the chart while the object is in the holder, and these marks bear characters 121 indentical with the characters 112.

When the shutter 76 is used to mask a portion of the sensitized material in the focal plane of the camera and the lens mount 79 is lowered to correspond, as previously described, it will, of course, throw off the reading of the scale 114 so far as the characters 115 thereon are concerned. For this reason a second set of characters 122 is arranged on the scale which constitute in effect a lowering of the scale of characters 115 to correspond with the changed position of the lens. When the object holder is operated under the guidance of this second set of characters its relation to the lens is restored and properly indicated. Also, when these smaller photographs are being made the indicated relationship between the areas, designated by the characters 112 on the chart, and the area of the sensitized material exposed is untrue and it is therefore necessary to provide the chart with a second set of subdivisions or areas defined by lines 123 and 124 thereon which are preferably made in a distinguishing color. These areas, however, bear the same relation to the fraction of the sensitized sheet exposed and the characters 125, by which they are indicated, bear the same relation to the characters 118 and 122 of the camera and object holder scale as before, the ratios of the respective dimensions being preserved. Marks 126 corresponding to the lines 123 and indicated by characters 127 are preferably similarly reproduced upon the cross bars 106 of the object holder, but the lines 124, being in the present instance identical with the lines 111, can be designated correctly by the characters 121 that also represent corresponding dimensions of the larger areas. An indicator 128 on the support 1 registers with a distinguishing mark 129 on the camera and, more specifically, on the bed frame 10 thereof when the mirror 5 of the lens is properly centered over the object holder 3 so that this adjustment may be easily regained in case it is desired for any purpose to move the lens to another point above the object holder or an article arranged thereon.

We claim as our invention:

1. The combination with a camera, comprising a lens and a support for the sensitized material, one of said elements being movable relatively to the other to change the focus, of an object holder movable toward and from the lens, a scale for recording the positions of the focusing element, a second scale for recording the positions of the object holder and similar sets of index characters on the two scales so arranged that when the parts give corresponding readings the camera will be properly focused with respect to the object holder and the object holder will be the proper distance from the lens for the latter to project the image of an object arranged on the support and having a predetermined area of outline measured in the characters of the scales, and agreeing with the readings thereof so that said image will appear in the focal plane of the camera as of the maximum size permitted by the area of the sensitized material exposed.

2. The combination with a lens, a support for the sensitized material and an object holder, two of said elements being movable along the axis of the lens to permit changes in the relative positions of all, of a scale for recording the positions of one of said movable elements, and means for defining the required position of the other at a given reading of the scale to bring an object on the holder, having a predetermined area of outline measured in the characters of the scale, and agreeing with the reading thereof, within the focus of the lens so that its image will be projected in the focal plane of the camera as of a maximum size permitted by the area of the sensitized material exposed.

3. The combination with a camera comprising a lens and means for exposing a sheet of sensitized material in the focal plane thereof, of an object holder movable toward and from the lens, a series of characters thereon dividing it into areas of different magnitudes, a scale having a definite position relatively to the camera for indicating the positions of the object holder, the characters thereon corresponding with those on the holder and being so arranged that a reading of the scale with the holder in a given position will indicate by the corresponding character on the holder such an area of the latter as will appear in the focal plane of the camera as of a maximum size permitted by the area of the sensitized material exposed.

4. The combination with a vertically guided object holder, of a camera lens arranged with its optical axis in a horizontal line and provided with a mirror for reflecting the image of an object in the holder therethrough, a support for a sheet of sensitized material in the focal plane of the lens, a shutter device for masking off a portion of the area of the sensitized material, a support for the lens permitting its vertical adjustment above the holder to center it with respect to the remaining portion of the sensitized material and a scale for indicating the positions of the holder with respect to the lens, said scale being provided with a double series of characters, one for use when the lens is centered with respect to the entire area of the sensitized material, and the other to indicate the same relative positions of the holder and lens when the latter is centered on the unmasked portion of said area.

OSCAR T. GREGORY.
NORMAN W. CARKHUFF.

Witnesses to the signature of Oscar T. Gregory:
ALEX. P. VILLARET,
EDWARD J. TOUSE.

Witnesses to the signature of Norman W. Carkhuff:
JOHN P. JOSEPH,
M. E. SWEANY.